Aug. 28, 1962     T. L. FAWICK     3,051,284
CENTRIFUGAL CLUTCH

Filed Jan. 19, 1959     2 Sheets-Sheet 1

INVENTOR.
THOMAS L. FAWICK
BY
Willard D. Eakin
ATTORNEY

*INVENTOR.*
THOMAS L. FAWICK
BY
*Willard D. Eakin*
ATTORNEY

United States Patent Office 3,051,284
Patented Aug. 28, 1962

3,051,284
CENTRIFUGAL CLUTCH
Thomas L. Fawick, Cleveland, Ohio, assignor to Fawick Corporation, a corporation of Michigan
Filed Jan. 19, 1959, Ser. No. 787,486
10 Claims. (Cl. 192—105)

This invention relates to centrifugal clutches of the type in which a set of circumferentially spaced set of centrifugal members or structures effect clutch engagement by crowding apart, axially of the clutch, a pair of rotary members which define between them an outwardly narrowing annular space. The present invention involves some of the features that are described and more broadly claimed in my copending application Ser. No. 782,480, filed December 23, 1958, now Patent No. 3,001,623, granted September 26, 1961.

The chief objects of the present invention are to provide a clutch of this type in which the centrifugal members or structures will have more extensive contact, with the rotary members against which they coact, than the point contacts that are provided by centrifugal balls; to provide the more extensive contacts without requiring a large amount of slippage between the centrifugal members or structures and the coacting rotary members, and especially in embodiments in which the said rotary members have unequal speeds; and to provide improved lubrication for a clutch of this type.

Figure 1:
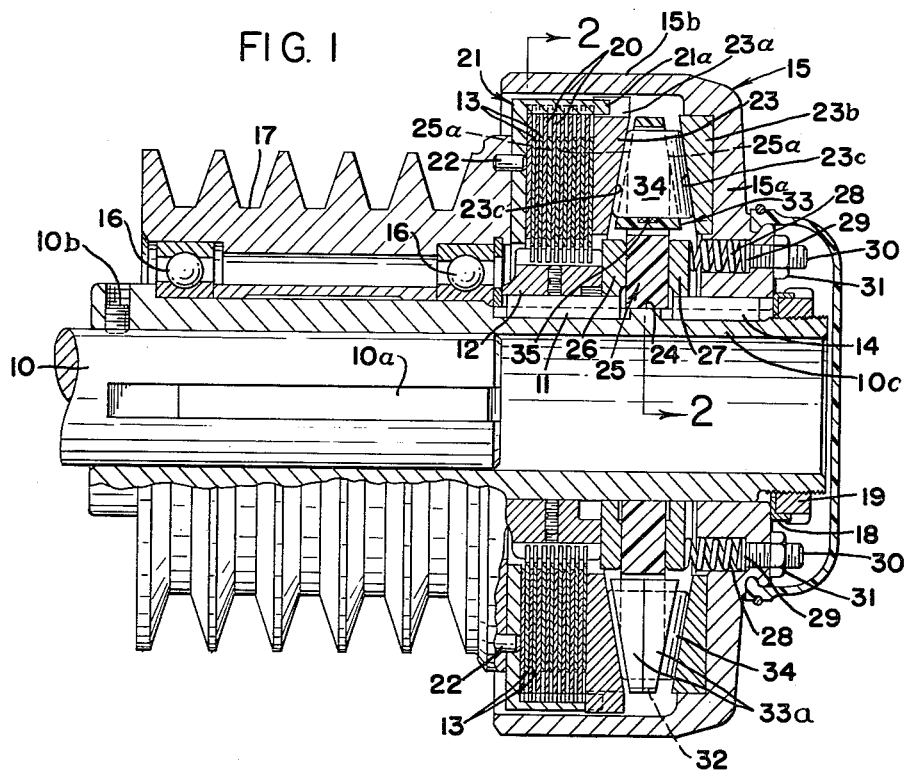
FIG. 1 is an axial section of a clutch embodying my invention in its preferred form for simplicity and economy of construction.

Referring first to the embodiment that is shown in FIGS. 1 to 4, the driving shaft 10, which is the rotary input drive element of the clutch, has secured upon it by a key 10a and a set-screw 10b an extension sleeve 10c. Mounted upon the said sleeve and secured against relative rotation by a key 11 is a driving clutch-hub 12 having the driving set of clutch-discs 13, 13 splined upon it. Also mounted upon the driving shaft 10 and secured against relative rotation thereon by a key 14 is a bell-shaped member 15 having a cam-ring-holding portion 15a and a plate-housing portion 15b.

The driving clutch-hub 12 is held against leftward movement by contact with the inner race of the adjacent one of ball-bearings 16, 16 by which the driven member 17, here shown as a multiple-V-belt pulley, is journaled upon the driving shaft 10. The member 15 is secured against rightward movement by a lock-washer 18 and a nut 19 on the extension sleeve 10c.

The driven clutch-discs 20, 20, are splined in a bell-shaped member 21 which is doweled, as at 22, 22, to the adjacent end of the driven pulley 17.

A presser plate 23 is slidably mounted in and centered by the bell portion of the driven element 21 and interlocked therewith against relative rotation by interengaged but axially slidable jaws 21a, 23a. A cam-disc ring 23b is mounted in the adjacent face of the member 15. Member 15 and ring 23b together constitute the rotary driving member in the clutch. Plate 23 is the rotatable driven member in the clutch which is movable axially toward and away from portion 23b of the driving member and is relatively rotatable with respect to the input drive element 10. The members 23 and 23b are formed with cam faces 23c, 23c, for coaction with the centrifugal cam sets. These confronting cam faces converge toward each other in a radially outward direction and define between them an annular cam space which is progressively narrower radially outward.

The extension sleeve 10c, between its keyways in which the keys 11 and 14 are mounted, is formed with a full-diameter annular zone 24, upon which is slidably and rotatably mounted a cam carrier in the form of an impelling ring 25, preferably made of a self-lubricating or inherently slippery and wear-resistant material such as nylon.

For frictionally driving the cam carrier 25 a friction ring 26 is keyed upon the sleeve 10c along with the drive-hub 12, between the latter and the adjacent plane side face of the cam carrier 25. A friction ring 27 is keyed upon the sleeve along with the driving member 15, between the latter and the adjacent plane side face of the cam carrier 25. The friction rings 26 and 27 are axially spaced friction drive members which are separate from the driving member 15, 23b in the clutch and from the driven member 23 in the clutch.

For pressing the group of rings 27, 25, 26 to the left, against the stop provided by the driving hub 12, a set of circumferentially spaced compression springs 28, 28 are mounted in respective sockets formed in the member 15 and bear against the adjacent side face of the friction ring 27. In each of the sockets is slidably mounted a spring-seat disc 29 and bearing against it is an adjusting screw 30 threaded through the end-wall of the spring-socket and provided, outside of the member 15, with a nut 31 for holding the screw in adjusted position. In this manner, the friction rings 26 and 27 are coupled (by means of the springs 28) to the input drive element 10 to be driven thereby and they frictionally engage opposite sides of the cam carrier 25 to rotate the latter. The adjusting screws 30 constitute adjustable means on the driving member 15 and acting against the springs 28 for selectively adjusting the axial force exerted by the latter against the friction ring 27.

The outer periphery of the cam carrier 25 is formed with a set of circumferentially spaced, radially extending recesses or sockets, defined by intervening impelling fingers 32, 32, the recesses being occupied by respective centrifugal cam sets, each of which comprises a bearing support in the form of a cage 33 and roller bearing means in the form of an outwardly tapered conical roller 34 mounted therein.

Figure 2:
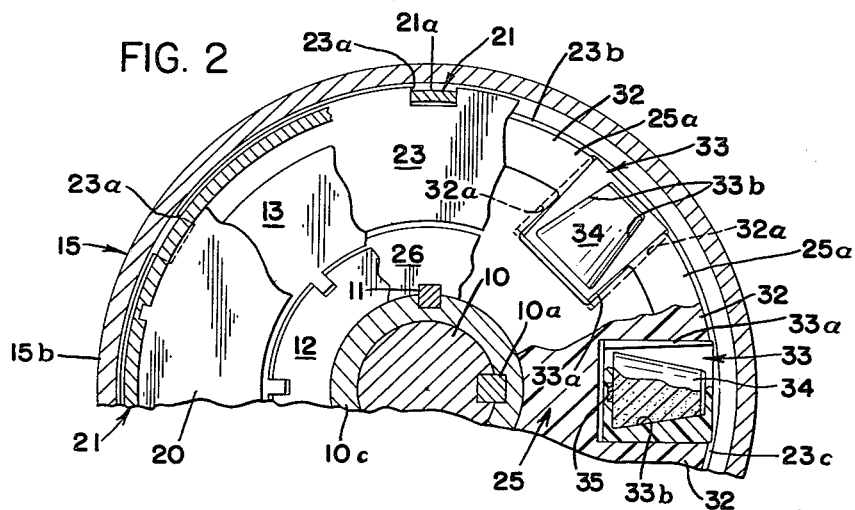
FIG. 2 is a section on line 2—2 of FIG. 1.
Figure 3:
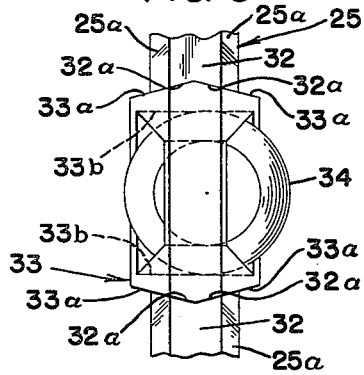
FIG. 3 is a fragmentary radial view showing one of the centrifugal sub-assemblies as viewed from its radially outer side, and part of the driving member for the sub-assemblies.
Figure 4:
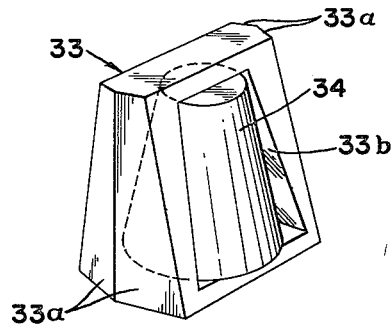
FIG. 4 is a perspective view of one of the sub-assemblies.

Each of the recesses defined by adjacent fingers 32 of the cam carrier 25 is open at the periphery of the cam carrier and has front and rear walls which are appropriately represented by non-radial, parallel sets of lines 32a, 32a in FIG. 2, each of the said walls being of V shape as seen in FIG. 3 at 32a, 32a. Each bearing support or cage, for coaction with the said walls 32a, is formed with complemental V-shaped front and rear walls, 33a, 33a, FIGS. 3 and 4, so that each cage can be slipped radially into its recess from the latter's open outer end and thus becomes interlocked with the adjacent fingers 32 of the cam carrier 25 against circumferential or axial displacement, while being free to slide radially of the cam carrier.

Internally each bearing support or cage is formed, front and rear, with a pair of plane roller-contacting faces 33b, 33b which outwardly converge at the same angle as that of the taper of the roller 34, for line contact in the circumferential impelling of the roller by the cage.

The relationship of the plane faces 33b, 33b is such that each roller 34 can be simply slipped sidewise into its cage before the cage, with the roller in it, is slipped radially into its socket, the roller then being confined by its cage and the cam faces 23c, 23c. When thus assembled, each bearing support or cage 33 extends around the respective roller 34 between the cam faces 23c.

The axially presented faces 25a, 25a, of the cam carrier 25 converge outwardly (FIGS. 1 and 3) so that ample clearance of the cam carrier from the cam faces 23c. 23c is provided at all positions radially of the assembly.

The floor of each cage is formed with a lubricant recess for occupancy by an oil-soaked felt pad 35, for lubrication of the base of the roller as it rotates under the supplemental centrifugal force of the cage. Alternatively the roller itself, or any other of the adjacent elements, can be of oil-saturated porous metal.

Preferably the parts are so proportioned, as shown clearly in FIG. 1, that initially the rollers coact with the cam faces 23c, 23c, to effect full drive engagement of the clutch discs 13 and 20 with the rollers a little to the right of the middle of their cages, so that the rollers can have a long range of shifting of their position as the clutch discs 13, 20 are made thinner by wear.

In the operation of the clutch the cam carrier 25 is frictionally driven by the friction rings 26, 27 between which it is mounted, and the time required for full clutch engagement can be changed by adjustment of the screws 30.

For the crowding apart of the cam rings 23, 23b, the centrifugal force of the rollers is supplemented by that of their cages.

While the speed of the driven elements is being brought up to that of the driving elements the cam carrier 25 rotates at a speed less than that of the driving ring 23b but greater than that of the driven ring 23, and because the rollers are tapered outwardly some surface slippage occurs at and near the outer and inner ends of the rollers, but because the rollers are free to rotate in their cages, with only light frictional resistance of the latter, the surface slippage of the rollers against the cam faces 23c, 23c is relatively small in amount at the middle parts of the rollers. Such wear as occurs is well distributed over the contacting surfaces and is of relatively small amount because of the line contact, as distinguished from the point contact, of the centrifugal balls of the prior art.

Figure 5:
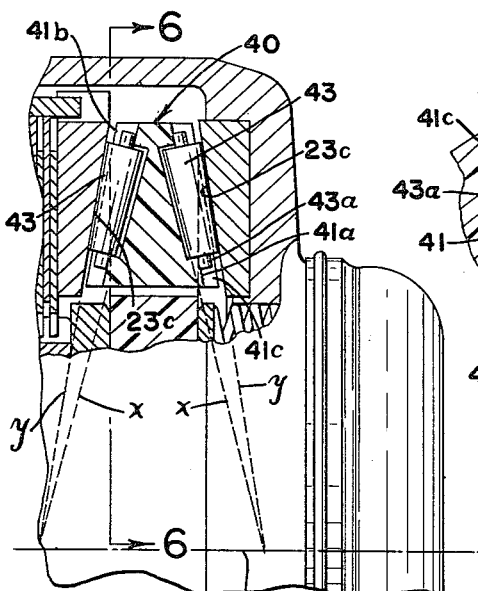
FIG. 5 is a fragmentary radial section of a modification, with parts shown in elevation.
Figure 6:
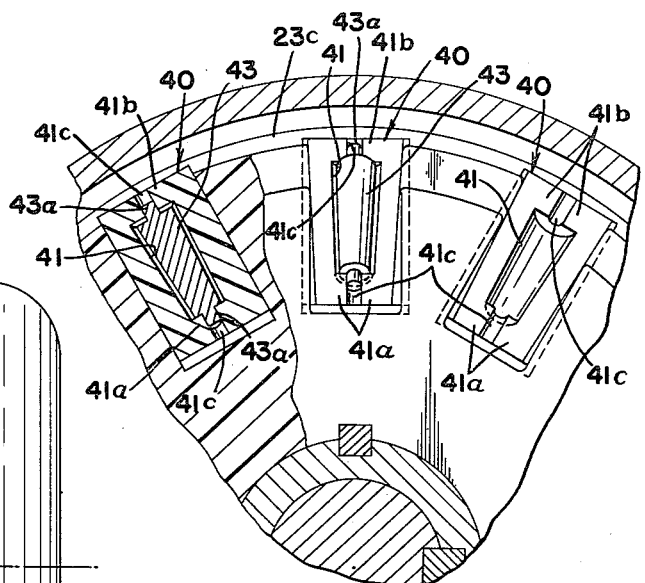
FIG. 6 is a section on line 6—6 of FIG. 5, with a part sectioned and broken away and with parts in elevation.
Figure 7:
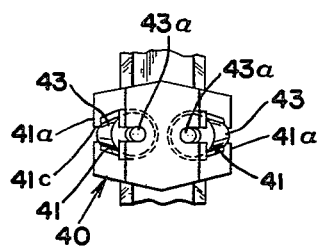
FIG. 7 is a fragmentary radial view showing one of the centrifugal sub-assemblies of FIGS. 5 and 6, as viewed from its radial outer side, and part of the driving member for the set of sub-assemblies.

The modification shown in FIGS. 5 to 7 corresponds to the embodiment above described except that each bearing support 40 instead of being internally formed to accommodate a single, outwardly tapered roller, is a simple outwardly tapered block formed at each of its sides with a recess 41, preferably tapered toward the clutch's axis of rotation, to accommodate with clearance the body of a roller 43 that is tapered toward the said axis. Each said recess is defined at its inner end by an end-wall 41a and at its outer end by an end-wall 41b, and the said end-walls are formed with respective bearing-notches 41c, 41c, for trunnions 43a, 43a projecting from the ends of the roller. Thus, in this embodiment, in each centrifugally movable cam set the bearing support is constituted by the block 40 and the roller bearing means is constituted by two rollers 43 at opposite sides of block 40.

Thus each composite recess, consisting of the roller-body recess 41 and the trunnion-receiving notches 41c, 41c, is shaped to receive the roller from the side of the block, the trunnions thus being seated in their notches as journals for the roller.

The shape of the block as described is such that it can be easily molded to shape, or can be easily cut to shape by well known cutting operations.

The taper of each roller and the inclination of the cam faces 23c, 23c are such, as clearly indicated by the broken extension lines $x$, $x$ and $y$, $y$ in FIG. 5, intersecting at the clutch's axis $z$ of rotation, that the rollers can roll upon the cam faces without surface slippage of their body portions, whatever the relative speeds of the adjacent members, the principle being comparable to that of bevel gears.

Other modifications are possible without departure from the scope of the invention as defined in the appended claims.

I claim:

1. In a centrifugal clutch assembly having a rotary driving member and a rotatable driven member mounted for relative movement axially with respect to one another, said driving and driven members presenting axially spaced apart, confronting annular cam faces which converge toward each other in a radially outward direction and which define between them an annular cam space which is progressively narrower radially outward, the improvement which comprises the combination of a rotary cam carrier, and a plurality of circumferentially spaced cam sets carried by said cam carrier in said cam space, each of said cam sets comprising a bearing support which is inter-locked with said cam carrier against movement circumferentially with respect to the cam carrier but free to move centrifugally outward as the cam carrier rotates, and roller bearing means rotatably mounted on said bearing support and projecting beyond said bearing support and having line contact with said cam faces across the latter in a direction centrifugally outward from the axis of the clutch.

2. The clutch assembly of claim 1, wherein said cam carrier has a plurality of circumferentially spaced, radially extending recesses which are open at the periphery of the cam carrier, and wherein said bearing supports are slidably received in said recesses and are insertable into said recesses at their open ends.

3. The clutch assembly of claim 2, wherein each of said recesses is V-shaped in cross-section at its opposite sides, and each of said bearing supports has V-shaped side edges for slidable engagement therewith.

4. The clutch assembly of claim 1, wherein said roller bearing means in each cam set comprises a single tapered roller which has line contact along substantially its entire length with both of said confronting cam faces, said roller being progressively smaller in cross-section toward its radially outward end.

5. The clutch assembly of claim 4, wherein said bearing support is a cage which extends around said single roller between said cam faces, said cage having oppositely disposed, inclined, flat interior surfaces which have line contact with the roller at opposite sides of the roller between said cam faces.

6. The clutch assembly of claim 5, wherein said cage at its radially inward send is formed with a recess which is open at the adjacent end of the roller, and wherein there is provided lubricant-soaked material in said recess for lubricating the rotation of the roller.

7. The clutch assembly of claim 1, wherein said roller bearing means in each cam set comprises a pair of rollers at opposite sides of said bearing support which have line contact along their entire lengths with the corresponding confronting cam faces on opposite sides of said bearing support.

8. The clutch assembly of claim 7, wherein said bearing support is progressively narrower in cross-section toward its radially outward end, the rollers of each pair are progressively narrower in cross-section toward their radially inward ends, and the rotational axes of the respective pair of rollers on each bearing support converge in a radially outward direction.

9. In a centrifugal clutch assembly, the combination of a rotary input drive element, a rotary driving member coupled to said input drive element to be driven thereby, a rotatable driven member mounted for axial movement toward and away from said driving member and for relative rotation with respect to said input drive element, said driving and driven members presenting axially spaced apart, confronting annular cam faces which converge toward each other in a radially outward direction and which define between them an annular cam space which is progressively narrower radially outward, a rotatable cam carrier mounted for relative rotation with respect to said input drive element, a plurality of circumferentially spaced cam sets carried by said cam carrier in said cam space for engagement with said cam faces, each of said cam sets comprising a bearing support which is interlocked with said cam carrier against movement circumferentially with respect to the cam carrier but free to move centrifugally outward as the cam carrier rotates, and roller bearing means rotatably mounted on said bearing support and projecting beyond said bearing support and having line contact with said cam faces across the latter in a direction centrifugally outward from the axis of the clutch, a pair of axially spaced rotatable friction drive members which are separate from said driving and driven members and which are coupled to said input drive element to be driven thereby and which frictionally engage opposite sides of said cam carrier to rotate the latter, and means for maintaining said friction drive members continuously in frictional engagement with said cam carrier irrespective of the position of said cam sets.

10. The clutch assembly of claim 9, wherein there are provided spring means acting between said driving member and one of said friction drive members and forcing said last-mentioned friction drive member axially against said cam carrier, and adjustable means on said driving member and acting against said spring means for selectively adjusting the axial force exerted by said spring means against said last-mentioned friction drive member.

References Cited in the file of this patent
UNITED STATES PATENTS

| | | |
|---|---|---|
| 860,590 | Williams | July 16, 1907 |
| 1,114,304 | Stanley | Oct. 20, 1914 |
| 1,606,544 | Vail | Nov. 9, 1926 |
| 1,801,590 | Dickson | Apr. 21, 1931 |
| 1,849,177 | Dickson | Mar. 15, 1932 |
| 1,850,226 | Dickson | Mar. 22, 1932 |
| 1,946,507 | Thomas | Feb. 13, 1934 |
| 1,947,632 | Woodruff | Feb. 20, 1934 |
| 2,180,217 | Thomas | Nov. 14, 1939 |

FOREIGN PATENTS

| | | |
|---|---|---|
| 1,098,801 | France | Mar. 9, 1955 |
| 1,144,739 | France | Apr. 29, 1957 |